(12) United States Patent
Lee

(10) Patent No.: US 6,598,258 B2  
(45) Date of Patent: Jul. 29, 2003

(54) WINTER WINDSHIELD WIPER FOR USE IN A MOTOR VEHICLE

(76) Inventor: Albert Lee, 232 Margate Rd., Timonium, MD (US) 21093

( * ) Notice: Subject to any disclaimer, the term of this patent is extended or adjusted under 35 U.S.C. 154(b) by 0 days.

(21) Appl. No.: 09/733,974

(22) Filed: Dec. 12, 2000

(65) Prior Publication Data

US 2002/0069475 A1 Jun. 13, 2002

(51) Int. Cl.[7] .................................................. B60S 1/38
(52) U.S. Cl. ................................ 15/250.201; 15/250.44
(58) Field of Search ........................ 15/250.201, 250.43, 15/250.44, 250.451, 250.361, 250.32, 250.46

(56) References Cited

U.S. PATENT DOCUMENTS

| | | | | |
|---|---|---|---|---|
| 4,342,126 A | * | 8/1982 | Neefeldt | 15/250.44 |
| 4,360,941 A | * | 11/1982 | Mabie | 15/250.06 |
| 5,311,636 A | | 5/1994 | Lee | 15/250.201 |
| 5,564,157 A | * | 10/1996 | Kushida et al. | 15/250.201 |
| 5,613,266 A | | 3/1997 | Lee | 15/250.201 |
| 6,108,857 A | | 8/2000 | Lee | 15/250.201 |

FOREIGN PATENT DOCUMENTS

| | | | | |
|---|---|---|---|---|
| GB | 2144976 | * | 3/1985 | 15/250.44 |
| JP | 49-148627 | * | 12/1974 | 15/250.201 |
| JP | 59-45251 | * | 3/1984 | 15/250.44 |
| JP | 401024655 | * | 5/1989 | 15/250.44 |
| JP | 7-242161 | * | 9/1995 | 15/250.44 |

* cited by examiner

*Primary Examiner*—Gary K. Graham  
(74) *Attorney, Agent, or Firm*—Birch, Stewart, Kolasch & Birch, LLP

(57) ABSTRACT

A winter windshield wiper assembly for a vehicle which comprises an elongated frame assembly including at least a primary yoke, said elongated frame assembly being enclosed by a sheet member, an elongated wiper blade supported by said elongated assembly, and a bridge member secured to said enclosed elongated frame assembly at both ends thereof, said bridge member and said enclosed elongated frame assembly defining an air space therebetween which enables the winter windshield assembly to operate with reduced resistance.

9 Claims, 1 Drawing Sheet

WINTER WINDSHIELD WIPER FOR USE IN A MOTOR VEHICLE

BACKGROUND OF THE INVENTION

1. Field of the Invention

The present invention relates to the construction of a winter windshield wiper assembly for use in a motor vehicle. More particularly, the present invention relates to a winter windshield wiper assembly which insures that the winter windshield wiper assembly remains in contact with the windshield of the motor vehicle during operation by providing an air space between the bridge member and the windshield wiper frame. The present invention also includes a bridge member with at least one pair of elongated vanes extending outwardly and downwardly at an angle from a front wall of the bridge member, whereby air pressure created by the movement of the vehicles forces the vanes to apply a force to the winter windshield wiper assembly ensuring contact with the windshield. Accordingly, the vanes help to effectively clean and wipe the convex surface of the windshield of the motor vehicle, especially in a cold climate. In addition, the operation life of the windshield wiper assembly is increased.

2. Description of the Related Art

Generally, various types of windshield wiper frames for a windshield wiper assembly are well known. As shown in FIG. 1, such windshield wiper frame 1 includes a bridge member 2, a pair of primary yokes 3 pivotally connected to the bridge member 2, a pair of secondary yokes 4 pivotally connected to one end of each primary yoke 3, a mounting stay 5 mounted on the outer end of each primary yoke and mounting stays 5 mounted on each outer end of the secondary yokes 4. However, such conventional art wiper frames 1 suffer from poor cleaning performance by the windshield wiper blade due to inadequate pressure on the windshield.

In order to improve cleaning performance, one of such conventional windshield wiper frames, as shown in FIG. 1, is equipped with the bridge member 2 having a pair of vanes 7 and horizontal elongated holes 6 extending from the rear walls thereof. However, this wiper frame suffers from a number of problems. For example, as air flowing past the vehicle presses down on the pair of vanes 7, the entire upper portion of the wiper frame 1 is also pressed down toward the glass, causing the entire frame to pivot slightly. Therefore, the lower portion of the wiper frame 1, and the wiper blade (not shown) itself may be lifted slightly away from the glass, thereby preventing the wiper blade from effectively cleaning the convex surface of the windshield glass. This pivoting can result in a decreased operational life of the wiper arm (not shown). In addition, some known bridge members 2 with vanes 7 lack the holes 6 disposed on the top of the bridge member 2. These openings are needed to maintain the pressure balance on the two sides of the bendable lip of the blade so as to achieve an effective cleaning operation.

U.S. Pat. No. 5,311,636 discloses a windshield wiper frame for use in a windshield wiper assembly for motor vehicles which includes a pair of primary yokes, and a bridge member pivotally connected to the pair of primary yokes. Furthermore, at least one elongated vane extends downwardly and at a slant from the front wall of the bridge member. This windshield wiper assembly can efficiently wipe the convex surface of the windshield glass and extend the operational life of the windshield wiper assembly. However, this windshield wiper frame may not be completely effective in the winter time, particularly where there is heavy snow.

U.S. Pat. No. 5,613,266 discloses a winter windshield wiper for use in a motor vehicle including a rubber sheet-sealed windshield wiper frame having a wiper blade thereon. A connecting member is attached to an upper surface of the frame. A horizontally elongated vane member having at least one wing is secured to the frame in order to improve the effectiveness of cleaning and to extending the operational life of the windshield wiper. However, this device also suffers from some of the above-mentioned problems.

U.S. Pat. No. 6,108,857 discloses an improved windshield wiper assembly for a motor vehicle which includes a connecting member connected to a wiper arm of the motor vehicle. A frame of the windshield wiper assembly is sealed by a rubber sheet disposed under the connecting member, and a bridge member is fixed between the connecting member and the rubber sheet. The bridge member includes a pair of flexible, elongated vanes which extend downwardly and at an angle from a front surface thereof, and a plurality of pairs of holes disposed on the top surface of the bridge member. The vanes direct the flow of air through the holes in the bridge member, thereby increasing air pressure on the wiper blade and improving the performance of the windshield wiper assembly. However, this windshield wiper may not be completely effective in the winter time or where there is heavy snow since the windshield wiper assembly is very heavy and possesses substantial resistance to operation.

SUMMARY OF THE INVENTION

Accordingly, it is an object of the present invention to provide an improved winter windshield wiper assembly which eliminates the problems encountered with the conventional winter windshield wiper. In order to accomplish these objects, the winter windshield wiper assembly for a motor vehicle of the present invention includes having at least one contoured and flexible vane and at least a pair of holes disposed on a bridge member.

Another object of the present invention is to provide an improved winter windshield wiper assembly including a bridge member, a sheet-sealed windshield wiper frame, and an air space disposed between the bridge member and the sheet-sealed windshield wiper frame for enabling air to flow therethrough which reduces resistance thereby enabling a smaller motor to operate the wiper assembly. The bridge member has at least one pair of elongated vanes which extend downwardly and at an angle from a front wall thereof, and at least one pair of horizontally elongated holes disposed on the top surface of the bridge member for effectively cleaning and wiping the convex surface of the windshield of a motor vehicle and for extending the operational life of the windshield wiper assembly.

The windshield wiper frame is sealed within a sheet which can be made of any natural or synthetic material which is effective for the intended purpose, i.e., to encase the frame within the sheet and separate it sufficiently from the bridge member to establish the desired air space therebetween. The sheet can be made of natural synthetic rubber.

A further object of the present invention is to provide an improved winter windshield wiper assembly, which is simple in structure, inexpensive to manufacture, easy to use, and refined in appearance.

Another object of the present invention is to provide elongated vane members attachable to a conventional winter windshield wiper. This provides an inexpensive method of improving the operation of existing winter windshield wipers.

Briefly described, the present invention is directed to an improved windshield wiper assembly for a motor vehicle, which includes a wiper arm attached to a body of the motor vehicle, a connecting member connected to the wiper arm, a rubber sheet-sealed windshield wiper frame disposed under the connecting member, a bridge member fixed to the connecting member and having a pair of elongated vanes extending downwardly and at an angle from a front surface thereof, and an air space disposed between the bridge member and the rubber sealed windshield frame for penetrating air therethrough. Furthermore, a pair of holes disposed on the top surface of the bridge member, whereby the vanes direct the flow of air through the holes in the bridge member, increasing air pressure on the wiper blade and improving the performance of the windshield wiper assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
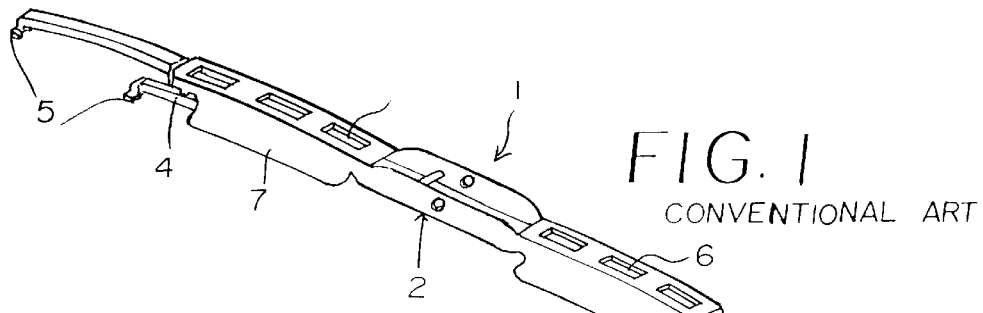
FIG. 1 shows a conventional winter windshield wiper assembly.

Referring now in detail to the drawings, preferred embodiments of the present invention will be described with reference to FIGS. 2–4. The winter windshield wiper assembly 10 for use in a motor vehicle includes a rubber sealed windshield wiper frame 12 which carries a wiper blade 25, and a bridge member 11. The windshield wiper frame 12 is sealed by a rubber sheet 24. The winter windshield wiper assembly 10 further includes an air space 26 disposed between the bridge member 11 and the rubber sealed windshield wiper frame 12 for enabling air to flow therethrough so that the windshield wiper can operate with less resistance. Accordingly, a smaller motor can be used to operate the windshield wiper assembly since the connecting members require less power.

Figure 2:
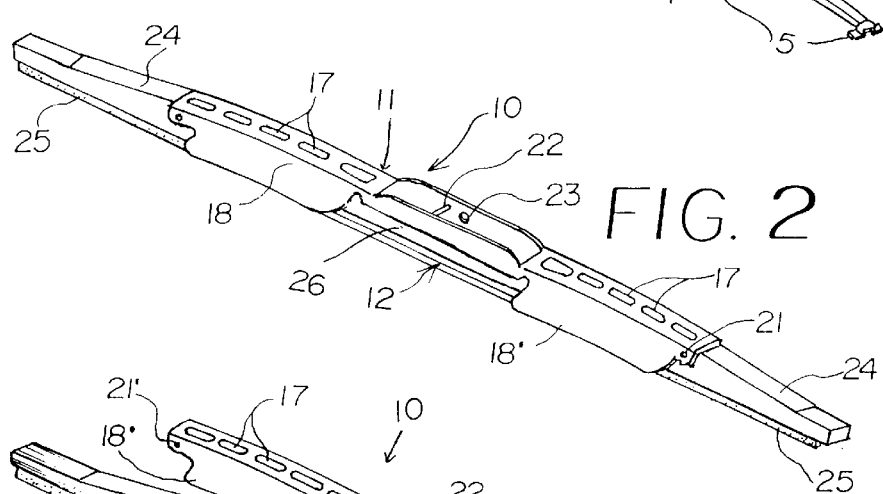
FIG. 2 is a perspective view of the winter windshield wiper assembly of the present invention.

Referring to FIG. 2, the windshield wiper frame 12 includes the connecting member (not shown) secured at an intermediate portion thereof and having a wiper arm engaging aperture (not shown) for securely receiving a wiper arm (not shown) of a motor vehicle. The bridge member 11 is mounted between the connecting member and the sealed windshield wiper frame 12, as can be best seen in FIG. 3. Accordingly, the winter windshield wiper assembly 10 of the present invention is capable of effectively cleaning and wiping the convex surface of a windshield (not shown) of a motor vehicle.

The bridge member 11 includes front and rear bridges 18 and 19, and a top surface 20. The front bridge 18 includes a pair of flexible, elongated vanes 18' which extend in a lengthwise direction of the bridge member 11. The vanes 18' project outwardly and downwardly from the front bridge 18, forming an angle with the front bridge 18 of greater than 90°, preferably about 135° (See FIG. 5). The top surface 20 of the bridge member 11 includes at least one pair of horizontal elongated holes 17 extending through the top surface 20. The drawings illustrate the holes 17 as being rectangular. However, it should be appreciated that holes 17 of other shapes could be used as well. As shown in FIGS. 2 and 3, there are preferably 2 to 6 pairs of holes 17, more preferably 5 pairs of holes 17.

Figure 5:
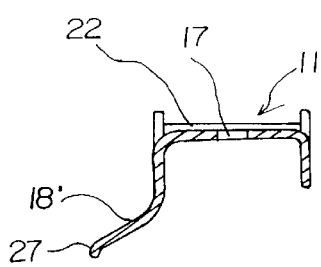
FIG. 5 is a sectional view through a portion of the winter windshield wiper assembly of the present invention.

Referring to FIG. 5, a cross-sectional view of the bridge member 11 through one of the holes 17 is illustrated. The top surface 20 having a plurality of holes 17 is spaced apart from the rubber sheet 24 and forms an elongated space 26 between an upper surface of the rubber sheet 24 and an inner surface of the bridge member 11. The space 26 is in communication with the holes 17 for receiving a flow of air guided from the vanes 18'. In addition to defining a space 26 for the flow of air, the bridge member 11 also provides strength to the front bridge 18 and the vanes 18'.

Figure 4:
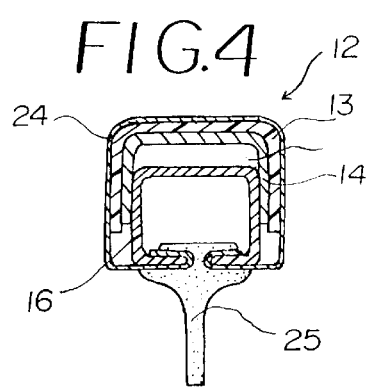
FIG. 4 is a sectional view through a portion of a rubber sealed windshield wiper frame of the winter windshield wiper assembly of the present invention.

Referring to FIG. 4, the flexible, elongated vanes 18' each include a flexible bent lip 27 formed therein. The vanes 18' direct the flow of air when the motor vehicle is moving and when the winter windshield wiper assembly 10 is operating, for applying a force to the bridge member 11. The vanes 18' direct the flow of air through the holes 17 on the top surface 20 of the bridge member 11, increasing air pressure on the wiper blade 25 and improving the performance of the windshield wiper assembly 10. The vane-directed air stream scatters and hits the convex surface of the windshield of the motor vehicle and pressure is exerted on the bent lips 27 which aid in applying the force to the bridge member 11. The holes 17 and the space 26 are needed to maintain a pressure balance on the two sides of the bendable lip 27 of the blade 25 so as to achieve an effective cleaning operation. As a result, the winter windshield wiper assembly 10 is forced into strong contact with the windshield of the motor vehicle so as to effectively clean and wipe the convex surface of the windshield, even though snow or other precipitation is disposed on the surface of the windshield. As a result, the performance of the winter windshield wiper assembly 10 is greatly improved. The flexible vanes 18' can be of any design as long as they function to collect air and direct its flow to achieve good contact between the wiper blade and the windshield of the vehicle.

Also, the air elongated space 26 defines less resistance which requires less power and, accordingly, a smaller motor can be used to operate the winter windshield wiper assembly 10 of the present invention.

Figure 3:
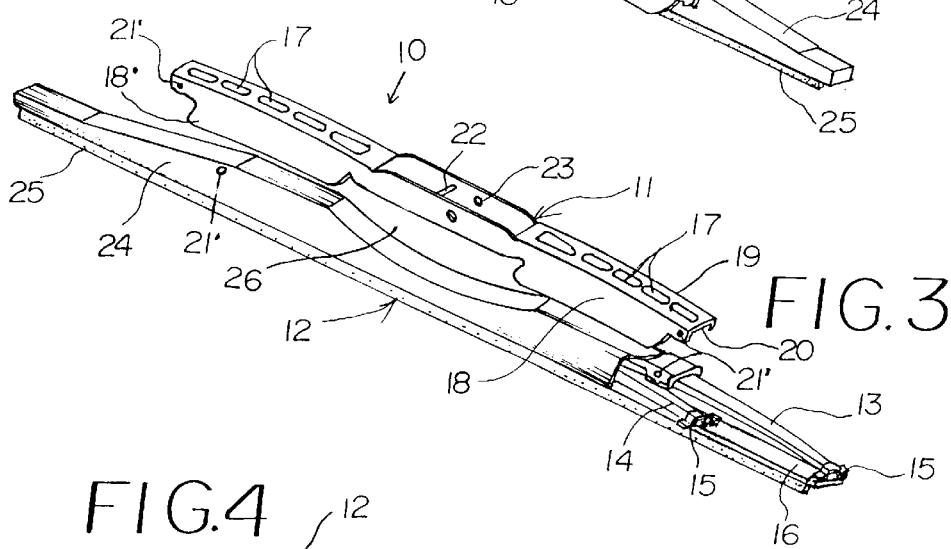
FIG. 3 is an exploded perspective view of the winter windshield wiper assembly of the present invention.

As shown in FIGS. 3 and 4, the bridge member 11, which is the same as the conventional bridge member 2 in FIG. 1, includes a pair of pin engaging apertures 23 for receiving a corresponding pin (not shown). The pin of the pin wiper arm (not shown) passes through the pin engaging apertures 23 on the bridge member 11. The bridge member 11 is secured to a primary yoke 13 by fixing a pair of rivets to a pair of the rivet-engaging apertures 21 formed in the primary yoke 13 of the wiper frame 12. The rubber sheet 24 seals the primary yoke 13, the second yokes 14, and the third yokes 16 as well as a flexible mounting craw 15 for mounting the wiper blade 25.

Accordingly, the winter windshield wiper assembly 10 of the present invention includes the bridge member 11, having the flexible, elongated vanes 18 thereon and holes 17 therethrough, which is attached to the rubber sheet 24 covering the windshield wiper frame 12 which contains the primary, secondary, and third yokes 13, 14 and 16. The flexible, elongated vanes 18' direct the air stream to scatter and strike the snow covered surface and/or the convex surface of the windshield of the motor vehicle, by applying a more direct force to the winter windshield wiper assembly 10 during operation.

When the windshield wiper assembly 10 is parked, the wiper assembly 10 can access an area under the hood of the motor vehicle. This structure provides a winter windshield wiper assembly 10 which effectively cleans and wipes the convex surface of the windshield of a motor vehicle, even though snow is on the surface of the windshield. Also, the operation life of the windshield wiper assembly 10 of the present invention is increased.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A winter windshield wiper assembly for a vehicle comprising:

an elongated frame assembly including at least a primary yoke, said elongated frame assembly being enclosed by a sheet member;

an elongated wiper blade supported by said elongated frame assembly; and a bridge member secured to said enclosed elongated frame assembly at both ends thereof, said bridge member including a top surface, a front surface and a rear surface, said bridge member and said enclosed elongated frame assembly defining an air space therebetween which enables the winter windshield assembly to operate with reduced air resistance, wherein said front surface of the bridge member is curved outwardly to form a pair of elongated vane members for collecting air flow to bias the elongated wiper blade against a windshield of a vehicle, said elongated vane members being an integral one piece member with said bridge member.

2. The winter windshield wiper assembly of claim 1, wherein a top portion of the bridge member is provided with a plurality of holes which communicate with said air space.

3. The winter windshield wiper assembly of claim 1, wherein said sheet member is made of rubber.

4. A winter windshield wiper assembly for a vehicle comprising:

an elongated frame assembly including at least a primary yoke, said elongated frame assembly being enclosed by a sheet member;

an elongated wiper blade supported by said elongated frame assembly; and a bridge member secured to said enclosed elongated frame assembly at both ends thereof, said bridge member including a top surface, a front surface and a rear surface, said bride member and said enclosed elongated frame assembly defining an air space therebetween which enables the winter windshield assembly to operate with reduced air resistance, wherein the bridge member is provided with a pair of elongated vane members which extend from a lower edge of said front surface for collecting air flow to bias the elongated wiper blade against a windshield of a vehicle, said elongated vane members being an integral one piece member with said bridge member.

5. The winter windshield wiper assembly of claim 4, wherein a top portion of the bridge member is provided with a plurality of holes which communicate with said air space.

6. The winter windshield wiper assembly of claim 4, wherein said sheet member is made of rubber.

7. A winter windshield wiper assembly for a vehicle comprising:

an elongated frame assembly including at least a primary yoke, said elongated frame assembly being enclosed by a sheet member;

an elongated wiper blade supported by said elongated frame assembly; and a bridge member secured to said enclosed elongated frame assembly at both ends thereof, said bridge member including a top surface, a front surface and a rear surface, said bridge member and said enclosed elongated frame assembly defining an air space therebetween which enables the winter windshield assembly to operate with reduced air resistance, wherein said front surface of the bridge member is curved outwardly to form at least one elongated vane member for collecting air flow to bias the elongated wiper blade against a windshield of a vehicle, said at least one elongated vane member being an integral one piece member with said bridge member.

8. The winter windshield wiper assembly of claim 7, wherein a top portion of the bridge member is provided with a plurality of holes which communicate with said air space.

9. The winter windshield wiper assembly of claim 7, wherein said sheet member is made of rubber.

* * * * *